Sept. 27, 1966     G. TCHOURILINE-KISSILEFF     3,275,420
UNITARY ROTARY GRANULATOR AND METHOD FOR
DRYING LIQUIFORM SUBSTANCES
Filed Dec. 12, 1962
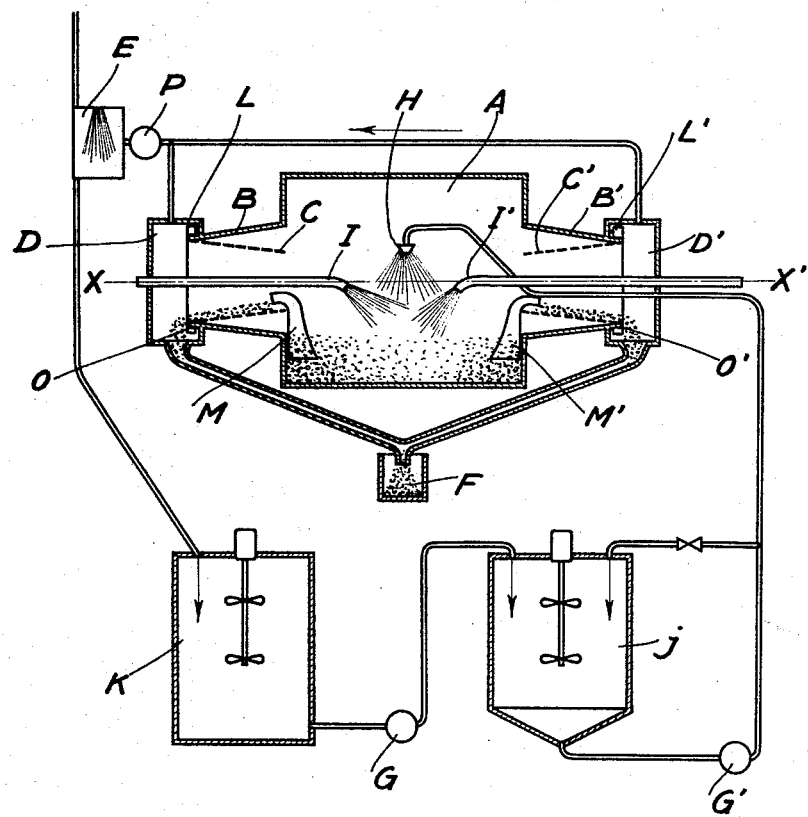
INVENTOR
GEORGES TCHOURILINE-KISSILEFF
By
Hammond + Littell
ATTORNEYS

United States Patent Office 3,275,420
Patented Sept. 27, 1966

3,275,420
UNITARY ROTARY GRANULATOR AND METHOD FOR DRYING LIQUIFORM SUBSTANCES
Georges Tchouriline-Kissileff, Lille (Nord), France, assignor to Etablissements Kuhlmann, Paris, France, a corporation of France
Filed Dec. 12, 1962, Ser. No. 244,152
Claims priority, application France, Dec. 13, 1961, 881,800
6 Claims. (Cl. 23—313)

This invention relates to a unitary rotary granulator that permits directly obtaining, from suspensions or solutions, calibrated, homogeneous, spherical granules having an exceptionally high porosity: a combination of properties never previously obtained.

The granulator of the invention essentially consists in a cylindrical drum revolving on its horizontal axis and having removal means on at least one of its lateral surfaces and sifting means subsequently positioned; in means located in the middle of the oven for atomizing the solution or suspension to be processed and spraying it on the granule bed forming at the lower part of the drum; and in heating means located between the bed and the atomizer.

The removal means and granule sifting means may consist of a drum in the shape of a truncated cone and of a drum sieve likewise partaking of a truncated cone, but converging in the opposite direction, each means being coaxial with the cylindrical drum, and of at least one funnel for picking up the granules from the lower part of the cylindrical drum and dumping them onto the screen, the convergences of the conical drum and screen being such that the smallest granules are returned to the lower part of the cylindrical drum and the largest are removed from the granulator.

The conical screen preferably has a pivoting striking hammer.

The means for removing the granules empties them into an air-tight compartment.

The compartment is connected with dust extraction means.

The heating means consists in one or more flame burners or hot gas injectors.

By way of example, and not in limitation thereof, one embodiment of the invention will now be described, with reference to the accompanying drawing, in which:

The single figure is a longitudinal cross section of the device of the invention.

In the figure, A is a rotary cylindrical oven rotatable about its axis XX'. D and D' are stationary airtight chambers. At each end, the oven A has small drums B and B' in the shape of truncated cones, in the interior of which are arranged perforated rotary screens C and C' that are likewise in the shape of truncated cones, but in the opposite sense, and having perforations of a diameter equal to or slightly less than that of the desired granules. Vertically adjustable pick-up funnels M and M', are fixed to rotary screens C and C'. A sprayer H located to spray downwardly and flame burners I and I' are arranged in the middle of the oven. The rotary screens C and C' have small rocking hammers L and L' and outlets O and O'. E is a dust extraction means; J the supply reservoir for the solution or suspension that is to be processed; K the vat in which the solution or suspension is prepared and to which the recovered fines and the subsequent heat are sent. Finally, G and G' are circulation pumps.

Although the arrangement just described is particularly advantageous, it also admits of variations. Thus, the flame burners I and I', for example, can be replaced by some other appropriate heating scheme, such as the introduction of hot gas. The combination of a funnel and perforated rotary screen for removing the granules can be replaced by a simple outlet cone. It is also possible to employ but a single outlet arrangement at one of the ends of the oven, or a single burner.

The invention operates in the following manner.

The solution or suspension, prepared in K, stored in J, and pumped by G', is sprayed by sprayer H in the middle of the oven. Because of the heat produced by burners I and I' located below, the solvent of the suspension is immediately volatilized and the solid constituents coalesce to form microspheres. The addition of more solution or suspension to the spheres already formed and their spinning movement cause them to enlarge by the regular and progressive addition of new microspheres at every point of their surfaces. This results in the formation of porous and perfectly regular spherical particles.

Moreover, as the applicant has himself observed, the spheres formed in the middle of the oven have imparted to them a more and more translatory movement toward the lateral walls the larger they become, such that the large spheres tend to mass along the lateral ends of the oven, where the outlet means are located, while the small spheres collect in the middle, precisely where, it occurred to the applicant to perform the spraying and heating of the solution or suspension to be treated.

This natural division of the particles as a function of their size—which is the basis of this invention—can be explained in the following manner.

If the oven, revolving about its axis, has a bed of spheres of all sizes, the driving forces are transmitted by mutual rubbing from the spheres in direct contact with the internal walls. The tangential speed imparted individually to each granule is as great as its diameter is large. Thus the largest and heaviest spheres progress all the more quickly, drawing towards the moving wall and driving out the smallest spheres. The spheres brought to the surface of the bed tumble down its slope to regain the curved moving wall of the oven.

However, this force, which would tend to congregate the small spheres at the heart, and along the entire length, of the moving bed, is completed by a second force perpendicular to the first, and transmitted this time from the spheres in direct contact with the lateral walls. Here again the largest spheres will have the tendency to approach the vertical moving walls, from which the small spheres are driven more and more towards the middle as their diameter is smaller.

The resultant of these two forces tends to cause the large spheres to mass symmetrically at each end of the oven and the small spheres to mass in the middle.

Funnels M and M', which dip into the mass of large spheres gathered near the lateral walls of the oven, gather up a portion of the spheres every time that the oven revolves and dump them on the perforated rotary screens. The spheres having a diameter equal to or slightly greater than that of the perforations move along the slope of the screen towards the outlets O and O', whereby they are removed from the oven. The smaller spheres fall through the screen perforations into drums B and B' and immediately returned to the moving mass of spheres. The spheres having exactly the same size as the perforations, and which might threaten to clog the screens momentarily, are freed by the blows of pivoting hammers L and L'.

While the spheres of the desired size remain on the screens, they undergo an additional drying due to the hot gas present.

The fumes produced in the oven are removed by a ventilator P and blown to a dust extraction means E, which can be a humid cyclone dust extractor, where the swept along dust is removed. This dust or fines are returned to the vat K, in which the solution or suspension is formed. Likewise, the sensible heat of the fumes can be recovered to preheat the liquid suspending medium in the preparation of the solution or suspension in K.

During the course of practical tests by the applicant, the invention was successfully used in the treatment of a very wide range of differing materials, such as alumina, zinc carbonate, oxides of iron and chromium, uranium compounds, copper oxides on a refractory carrier, for example, in order to condition the purification masses, the active catalysts, or else to form granules from solutions containing recoverable substances. It is obvious that all substances granulable by conventional methods are even more susceptible to granulation in the one-piece apparatus just described.

The uniformity of shape and size and the mechanical properties of the granules obtained with the apparatus of the invention make the apparatus particularly attractive for obtaining catalysts and fertilizer granules and in the drying and granulation of substances difficult to treat by other means.

The product recovered in F, at the output of the granulating oven, has the form of regular, homogeneous spheres, having an elevated porosity. This unique combination of properties is a direct result of the circumstances by which they are formed: an agglomeration of microspheres formed by an uninterrupted succession of layers until the desired final size is reached.

In addition, and as already pointed out, the spherical and porous granules have an improved mechanical resistance, which is preserved against all fluctuation in temperature.

Actual operation of the invention has shown that its use is extremely flexible, the output essentially depending on the amount of heat furnished by the burner, which is regulated to the quantity of suspension that is to be atomized, that is, to the volume of liquid, in the solution or suspension, that must be evaporated.

The output is also improved by rotating the oven faster. However, the number of revolutions per minute is limited, in an oven having smooth walls, by the necessity of retaining the friction forces transmitted from the large spheres in direct contact with the oven walls, as previously described. Above a certain speed the mass of spheres would simply slide on the walls, impairing the operation of the oven. Using roughened walls or adding impediments to smooth walls that prevent sliding would, of course, permit the speed limit to be exceeded.

By way of example, and not in limitation thereof, there will be described the manufacture of a granulated catalyst from ferrochromic slurry, comprising, in 100 liters of slurry, 24 kg. of solid matter composed chiefly of iron hydroxide, with a small amount of chromium hydroxide.

The diameter and depth of the oven were each 1.50 meters, the speed of rotation 3 r.p.m., and the screen perforations 8 mm. in diameter.

The slurry was atomized in a conventional Lechler atomizer at the rate of 175 liters per hour. The temperature at the center of the granule bed in the oven was 100°/105° C., and in the screens was 250° C.

40 kg./hr. of ferrochromic oxide granules of 8 mm. diameter were obtained and 100 cubic meters per hour of gas containing 1000 calories per cubic meter of sensible heat were evacuated.

What I claim is:

1. A method of forming spherical porous granules from particles of matter associated with a liquid in the form of a slurry or solution comprising atomizing the said slurry or solution at the center of an oven toward a bed of granules being formed, heating the atomized slurry or solution as it comes into contact with the said bed of granules whereby the liquid is evaporated and solid particles are formed and coalesce, rotating said oven whereby spherical granules are formed from said coalesced particles and the spherical granules move laterally away from the center of the oven toward the ends thereof as they grow larger and removing the spherical, porous granules at the said ends of the oven.

2. The method of claim 1, wherein the granules are sorted as to size while being removed and granules below a predetermined size remain in the oven.

3. An apparatus for forming spherical porous granules from particles of matter associated with a liquid in the form of a slurry or solution comprising a rotatable oven having opposed discharge ends; atomizing means mounted centrally of said oven between said ends, adapted to discharge said slurry or solution in atomized form; heating means to heat the atomized slurry or solution while the latter comes into contact with the bed of granules being formed to allow evaporation of the liquid and formation and coalescence of solid particles whereby rotation of said oven causes the coalesced particles to form spherical granules and the spherical granules to move laterally away from the center of the oven toward said ends as they grow larger, and means, at the said ends, to withdraw the granules from the oven.

4. The apparatus of claim 3 wherein said withdrawing means includes a sieve at each end, for sorting granules so granules of a predetermined minimum size are removed.

5. An apparatus for forming spherical porous granules from particles of matter associated with a liquid in the form of a slurry or solution comprising an oven having a rotatable cylindrical body provided with a frusto-conical discharge conduit at each end thereof with the wider end thereof directed toward the center of the body; discharge chambers on which said conduits open; a frusto-conical sieve mounted coaxially in each of said discharge conduits with the wider end thereof directed outwardly of said body; atomizing means mounted centrally of said body between the ends thereof to discharge said slurry or solution in atomized form toward the bed of granules being formed located below; heating means under said atomizing means to heat the atomized slurry or solution while the latter comes into contact with the said bed of granules to allow evaporation of the liquid and formation and coalescence of solid particles, whereby rotation of said body causes the said coalesced particles to form spherical granules and the spherical granules to move laterally away from the center of the body toward the ends thereof as they grow larger and means, within said body, to discharge granules within said frusto-conical sieves whereby undersized granules may fall between the sieves and conduits back into said body and oversized granules pass into said discharge chambers.

6. The apparatus of claim 5 wherein means to prevent the clogging of the sieves are provided.

References Cited by the Examiner

UNITED STATES PATENTS

| | | | |
|---|---|---|---|
| 1,141,169 | 6/1915 | Beisanz | 209—270 |
| 2,411,873 | 12/1946 | Firth | 23—313 X |
| 2,416,615 | 2/1947 | Datin. | |
| 2,561,394 | 7/1951 | Marshall. | |
| 2,635,684 | 4/1953 | Joscelyne. | |
| 2,778,056 | 1/1957 | Wynne. | |
| 2,834,043 | 5/1958 | Haley et al. | |
| 2,872,300 | 2/1959 | Pollock | 23—314 |
| 2,883,274 | 4/1959 | Ceresna. | |
| 2,889,576 | 6/1959 | Selig. | |
| 2,948,948 | 8/1960 | Duplin et al. | |
| 2,979,421 | 4/1961 | Rissman et al. | 23—313 X |

NORMAN YUDKOFF, *Primary Examiner.*

J. SOFER, *Assistant Examiner.*